US011460907B2

(12) United States Patent
Kadam et al.

(10) Patent No.: US 11,460,907 B2
(45) Date of Patent: Oct. 4, 2022

(54) RECEPTACLE WITH AN INTEGRATED POWER METER

(71) Applicant: EATON INTELLIGENT POWER LIMITED, Dublin (IE)

(72) Inventors: Nilesh Ankush Kadam, Pune (IN); Sushant Raut, Pune (IN); Saivaraprasad Murahari, Peachtree City, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 243 days.

(21) Appl. No.: 16/595,707

(22) Filed: Oct. 8, 2019

(65) Prior Publication Data

US 2021/0103326 A1   Apr. 8, 2021

(51) Int. Cl.
*G06F 1/3234* (2019.01)
*H02J 50/80* (2016.01)
*H02J 7/00* (2006.01)

(52) U.S. Cl.
CPC .......... *G06F 1/3243* (2013.01); *H02J 7/0027* (2013.01); *H02J 50/80* (2016.02); *G06F 2213/0042* (2013.01)

(58) Field of Classification Search
CPC ............ G06F 1/3243; G06F 2213/0042; H02J 50/80; H02J 7/0027
See application file for complete search history.

(56) References Cited

U.S. PATENT DOCUMENTS

| 6,095,850 A * | 8/2000 | Liu | G01R 13/02 |
| | | | 439/488 |
| 10,483,679 B1* | 11/2019 | Kadam | H01R 13/447 |
| 11,101,649 B2* | 8/2021 | Saunders | H02J 1/12 |
| 2012/0086437 A1* | 4/2012 | Lin | G01R 22/10 |
| | | | 324/156 |
| 2012/0185107 A1* | 7/2012 | Takehara | H02J 3/005 |
| | | | 700/292 |
| 2012/0313571 A1* | 12/2012 | Knowlton | H02J 7/00718 |
| | | | 320/107 |
| 2013/0264998 A1* | 10/2013 | Schul | H02J 7/0049 |
| | | | 320/107 |

(Continued)

FOREIGN PATENT DOCUMENTS

CN    106797129 B   * 10/2020   ............... H02J 7/00

*Primary Examiner* — Vincent H Tran
(74) *Attorney, Agent, or Firm* — Eckert Seamans Cherin & Mellott, LLC

(57) ABSTRACT

A receptacle includes a plurality of universal serial bus (USB) power delivery (PD) ports couplable to one or more devices to be charged, a plurality of USB PD controllers coupled to the plurality of USB PD ports in a one-to-one manner, where the plurality of USB PD controllers are structured and configured to negotiate power sharing when the plurality of USB PD ports are coupled to a plurality of devices to be charged, a microcontroller coupled to the plurality of USB PD controllers and structured and configured to receive, from at least one USB PD controller of the plurality of USB PD controllers, real-time charging information including at least a power profile of the one or more devices to be charged, and a display coupled to the microcontroller and structured and configured to receive and display the real-time charging information.

18 Claims, 6 Drawing Sheets

(56) References Cited

U.S. PATENT DOCUMENTS

| | | | | |
|---|---|---|---|---|
| 2014/0375249 A1* | 12/2014 | Xiang | ............... | H02J 7/0047 |
| | | | | 320/107 |
| 2015/0349563 A1* | 12/2015 | Bishtein | ............ | H02J 7/007 |
| | | | | 320/107 |
| 2016/0006283 A1* | 1/2016 | Liu | ................. | H02J 7/0026 |
| | | | | 320/112 |
| 2016/0253280 A1* | 9/2016 | Saito | ................. | G06F 1/325 |
| | | | | 710/313 |
| 2017/0279295 A1* | 9/2017 | Wojcik | ............... | H02J 50/80 |
| 2018/0138703 A1* | 5/2018 | Chan | ................. | G06F 1/263 |
| 2018/0203497 A1* | 7/2018 | Sagneri | ............. | G06F 1/206 |
| 2018/0254669 A1* | 9/2018 | Rahman | ............. | H02J 50/80 |
| 2018/0287491 A1* | 10/2018 | Muto | ................. | H02M 3/156 |
| 2019/0027953 A1* | 1/2019 | Rohmer | ............. | H02J 7/0044 |
| 2019/0227609 A1* | 7/2019 | Koshigaya | ......... | G06F 1/266 |
| 2019/0344665 A1* | 11/2019 | Zapryanov | ......... | G01D 7/08 |
| 2019/0356142 A1* | 11/2019 | Meyer | ............ | H02J 7/00038 |
| 2019/0384731 A1* | 12/2019 | Chen | ............... | G06F 13/385 |
| 2020/0076215 A1* | 3/2020 | Shen | ............... | H02J 7/0045 |
| 2021/0048468 A1* | 2/2021 | Biggs | ............... | G01R 31/55 |

\* cited by examiner

RECEPTACLE WITH AN INTEGRATED POWER METER

BACKGROUND

Field

The disclosed concept relates generally to receptacles, and in particular, to receptacles with an integrated power meter.

Background Information

Electricity is often provided to electric devices via an electrical receptacle in the wall or floor of a room. Electrical receptacles are usually duplex-type electrical receptacles that include two sockets coupled together with a common housing. Each socket is able to electrically connect to and provide power to one power cord.

Some types of receptacle have replaced one of their sockets with one or more universal serial bus (USB) ports. The receptacle will include circuitry to convert utility power to that which is usable by the USB ports. The receptacle also needs to include a controller to control operation of the USB ports. The USB ports can be used to charge a variety of electronic devices such as phones and tablets.

Over the years, several different types of USB ports have been defined in USB specifications. As the demand for power with different voltages and current configurations increases, USB power delivery (PD) may become most popular over traditional USB Type-C. USB PD may refer to a specification which supports power delivery up to 100 W while transmitting data over the same cable at the same time. A USB Type-C may refer to a reversible USB connector specification that may support a number of standards including USB 3.1, DisplayPort, or USB PD. A USB Type-C PD may include a USB Type-C port implemented with USB PD, which may handle power up to 100 W. Under the USB PD standards, voltage may be configurable, e.g., 5V, 9V, 12V, 15V or 20V configurations, and changed based on a device connected to the USB PD ports. However, the configuration is selected or changed automatically by the controller and the current configuration may not be known by a user.

There is room for improvement in receptacles for USB charging.

SUMMARY

These needs and others are met by embodiments of the disclosed concept in which a receptacle with an integrated power meter, e.g., a smart USB Type-C power delivery receptacle with an integrated power meter having a display, is provided. The integrated power meter having a display may be referred to as an integrated power meter, power meter, display or display/power meter throughout the present disclosure.

In accordance with one aspect of the disclosed concept, a receptacle with an integrated power meter may include: a plurality of universal serial bus (USB) power delivery (PD) ports couplable to one or more devices to be charged; a plurality of USB PD controllers coupled to the plurality of USB PD ports in a one-to-one manner, wherein the plurality of USB PD controllers are structured and configured to negotiate power sharing when the plurality of USB PD ports are coupled to a plurality of devices to be charged; a microcontroller coupled to the plurality of USB PD controllers and structured and configured to receive, from at least one USB PD controller of the plurality of USB PD controllers, real-time charging information including at least a power profile of the one or more devices to be charged; and a display coupled to the microcontroller and structured and configured to receive and display the real-time charging information.

In accordance with another aspect of the disclosed concept, a receptacle with an integrated power meter may include: a plurality of sockets structured and configured to receive one or more plugs for charging one or more devices; a plurality of USB PD ports couplable to one or more devices to be charged; a plurality of USB PD controllers coupled to the plurality of USB PD ports in a one-to-one manner, wherein the plurality of USB PD controllers are structured and configured to negotiate power sharing when the plurality of USB PD ports are coupled to a plurality of devices to be charged; a microcontroller coupled to the plurality of USB PD controllers and structured and configured to receive, from at least one USB PD controller of the plurality of USB PD controllers, real-time charging information including at least a power profile of the one or more devices; and a display coupled to the microcontroller and structured and configured to receive the real-time charging information from the microcontroller and display the real-time charging information.

In accordance with yet another aspect of the disclosed concept, a method for USB PD using a receptacle with an integrated power meter, including: receiving, by at least one USB PD controller of a plurality of USB PD controllers of the receptacle, one or more power profiles of one or more devices coupled to the receptacle for charging; transmitting, by the at least one USB PD controller, at least the one or more power profiles of the one or more devices to a microcontroller of the receptacle; charging the one or more devices via at least one USB PD port of a plurality of USB PD ports of the receptacle; and displaying real-time charging information including at least a voltage configuration.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
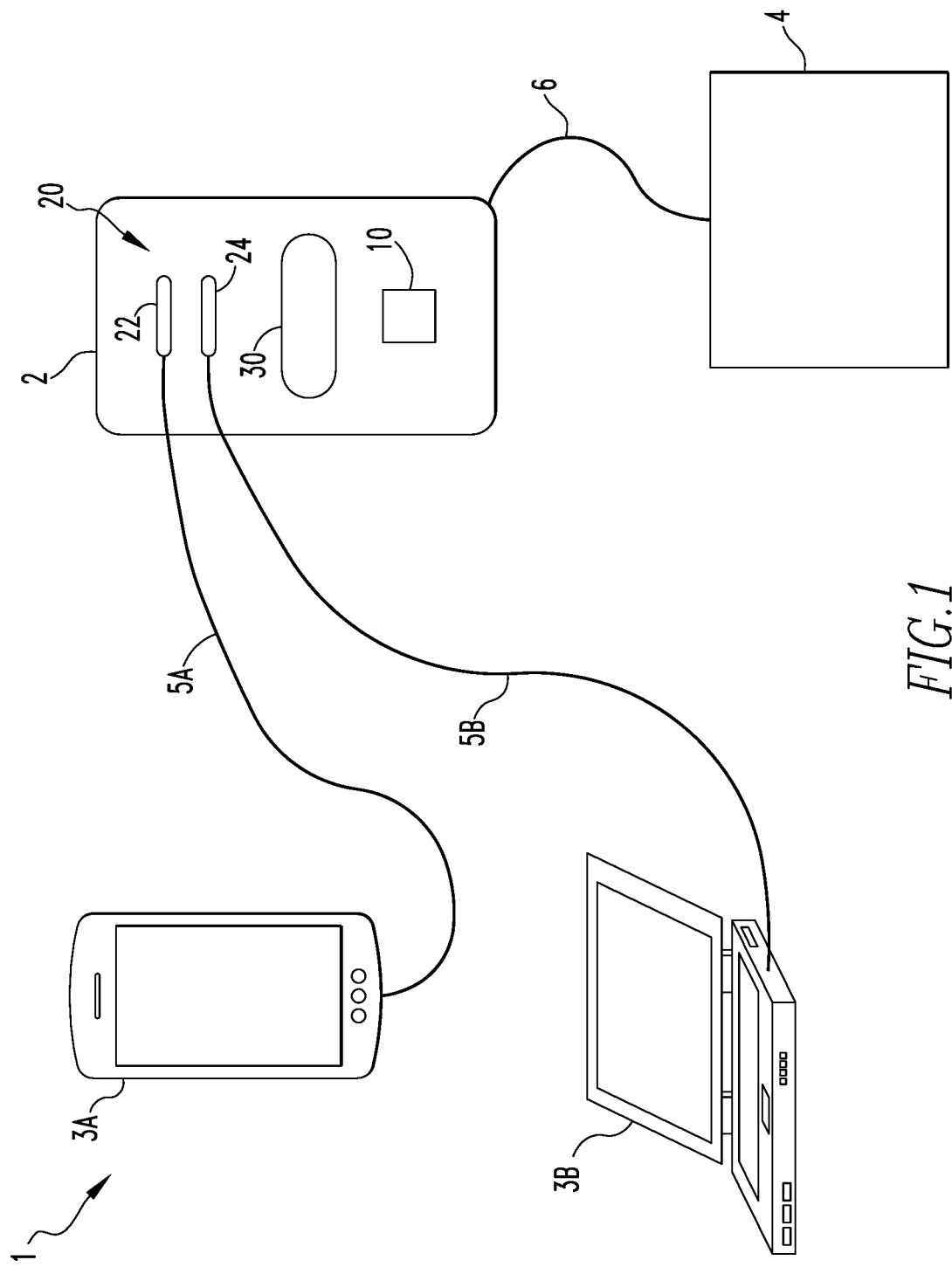
FIG. 1 is a schematic diagram of a USB PD system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Trends for charging devices are changing as a demand for power with different voltages and current configurations increases. As such, USB power delivery (PD) may become most popular over traditional USB Type-C. USB PD may refer to a specification which supports power delivery up to 100 W while transmitting data over the same cable at the same time. A USB Type-C may refer to a reversible USB connector specification that may support a number of standards including USB 3.1, DisplayPort, or USB PD. A USB Type-C PD may include a USB Type-C port implemented with USB PD, which may handle power up to 100 W. Hereinafter, a USB Type-C port implemented with USB PD may be referred to as a USB Type-C PD port. Under the USB PD standards, voltage may be configurable, e.g., 5V, 9V, 12V, 15V or 20V configurations, and changed based on a device connected to the USB PD ports. For example, a hand-held device may have a power profile or rule including a voltage configuration of 5V at 3 A only. In another example, a tablet may have a power profile or rule including a plurality of voltage configurations, e.g., 5V at 3 A, 9V at 3 A, or 12V at 2.25 A. In yet another example, a notebook may have a power profile or rule including a plurality of voltage configurations, e.g., 5V at 3 A, 9V at 3 A, 12V at 2.25 A, or 20V at 3 A. As such, under the USB PD standards different voltage configurations may be used based on the type of the device being charged. Further, the voltage configuration may be changed based on a number of devices being charged and the type of devices being charged. For example, a USB PD port may use the 12V/2.25 A configuration when charging a laptop only, but change the voltage configuration to the 5V/3 A if, for example, a handheld device is also connected to another USB PD port for charging.

When charging one or more devices via the USB PD ports, a user may need to monitor real-time voltage, current, and power information and to check charging performances of USB charging cables or a power bank. Conventional receptacles may not include any monitoring component that may provide such real time monitoring, thereby leaving the user at a loss as to what the voltage, current, power usage, charging performance (e.g., charging speed or quality) may be during charging. As such, the user may be required to add external hardware for power reading during charging devices. Further, the user may be required to manually check specifications for each of the USB charging cables to determine whether the right USB charging cables are being used.

Example embodiments of the disclosed concept address these issues. For example, the receptacle includes an integrated power meter with a display (e.g., without limitation, a liquid crystal display (LCD), multi-colored LEDs, etc.), which allows the user to easily monitor the real-time voltage, current and power information via the display. Further, the integrated power meter may be used to check the charging performance of the USB charging cables, and test capacity and/or electric energy of a power bank.

FIG. 1 is a schematic diagram of a USB PD charging system 1 in accordance with an example embodiment of the disclosed concept. The USB PD system 1 may include a receptacle 2, devices 3A,3B coupled to the receptacle 2 for charging, and a power source 4. The receptacle 2 may charge the devices 3A,3B with power received from the power source 4 via the USB charging cables 5A,5B. The receptacle 2 may include a socket 10, a USB connection area 20 including USB Type-C PD ports 22,24, and a display 30. The socket 10 may be coupled to the power source 4 via a power cable 6 or wirelessly, and may be structured and configured to receive utility power (e.g., 120 Vac) from the power source 4. The USB Type-C PD ports 22,24 may be coupled to the power source 4 via the power cable 6 or wirelessly, and may be structured and configured to receive power from the power source 4 and provide power for charging the devices 3A,3B via USB charging cables 5A,5B. The USB Type-C PD ports 22,24 are structured and configured to receive USB Type-C connectors. The display 30 may display real-time power information, including a voltage configuration, current, power used for charging each device 3A,3B, etc. The devices 3A,3B may be any devices or systems chargeable by the USB Type-C PD ports 22,24, e.g., a handheld device, a tablet, a netbook, a laptop, a notebook, a hub, a dock, a workstation, etc. The power source 4 may be a power station, a power plant, etc.

Figure 2:
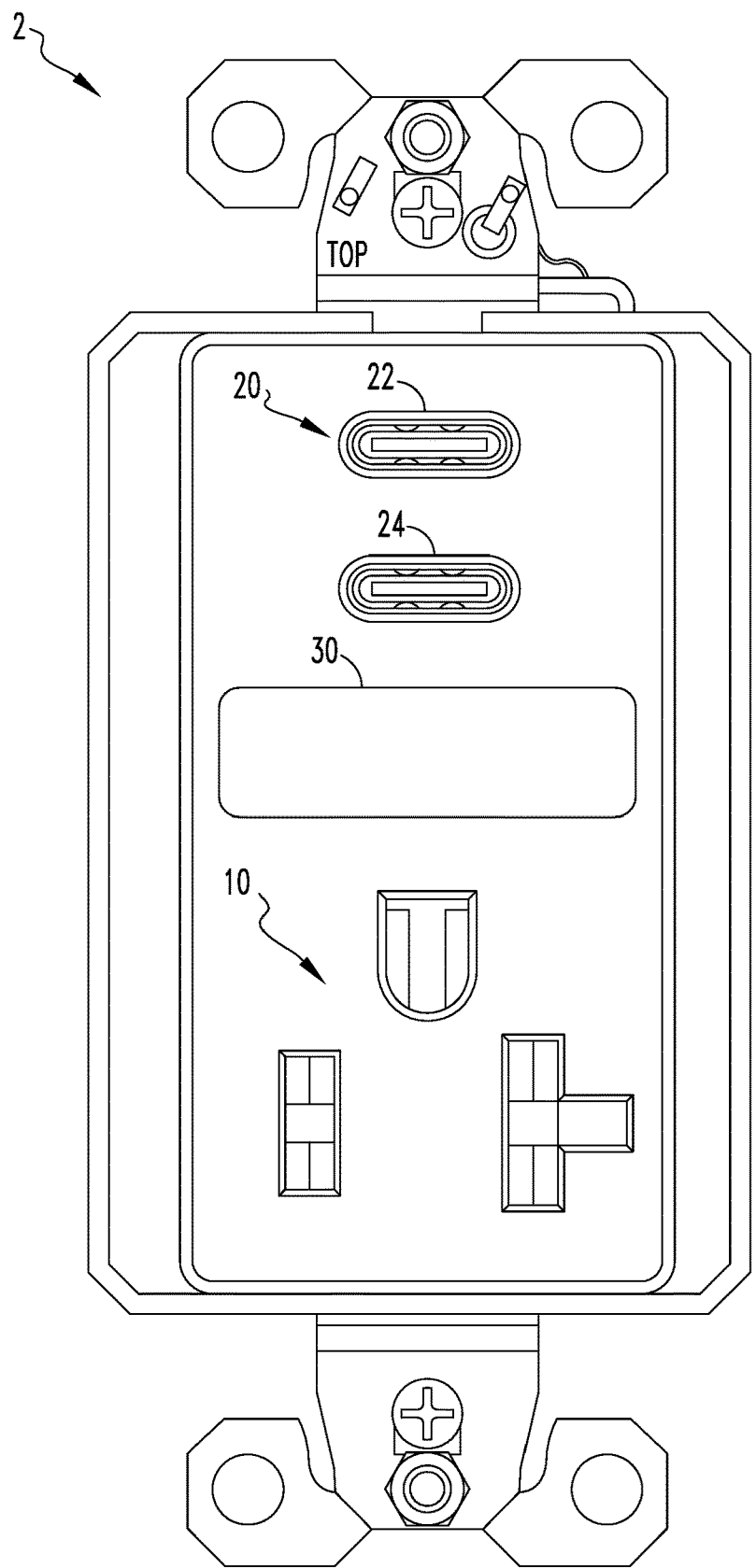
FIG. 2 is a front view of an example receptacle in accordance with an example embodiment of the disclosed concept.

FIG. 2 is a front view of an example receptacle 2 in accordance with an example embodiment of the disclosed concept. The receptacle 2 includes a traditional socket 10, a USB connection area 20 including USB Type-C PD ports 22,24 and a display 30. The socket 10 and/or the USB connection area 20 may be coupled to a power supply, e.g., a flyback circuit (discussed in detail with reference to FIG. 3), which may convert AC utility power to DC power for use by the socket 10 and/or the USB Type-C PD ports 22,24.

The USB Type-C PD ports 22,24 may receive power for, e.g., charging one or more devices (e.g., the devices 3A,3B as described with reference to FIG. 1) connected to the USB Type-C PD ports 22, 24 via USB charging cables (e.g., USB charging cables 5A,5B as described with reference to FIG. 1). The USB Type-C PD ports 22, 24 may be smart USB ports in that the USB Type-C PD ports 22, 24 each may allow devices 3A,3B to specify the amount of current the devices 3A,3B need for charging and disconnect the current once the devices 3A,3B are fully charged. The USB Type-C PD ports 22,24 are structured and configured to receive USB Type-C connectors. Under the USB standards, the USB Type-C PD ports 22,24 may support devices with power profiles or rules including one or more voltage configurations. The power profiles or rules may vary depending on a device type of the devices 3A,3B. For example, a hand-held device 3A may have a power profile or rule that may be corresponsive to a voltage configuration of 5V at 3 A only, requiring power of 15 W for charging. In another example, a tablet may have a power profile or rule including a plurality of voltage configurations, e.g., 5V at 3 A, 9V at 3 A or 12V at 2.25 A, requiring power of 15 W or 27 W for charging. In this example, the USB Type-C PD port 22,24 may charge the tablet using any of the 5V/3 A, 9V/3 A or 12V/2.25 A configurations. If the USB port 22,24 charges the tablet using the 5V/3 A configuration, power of 15 W may be used, and if the USB port 22,24 charges the tablet using the 12V/2.25 A configuration, power of 27 W may be used. In yet another example, a notebook 3B may have a power profile or rule including a plurality of voltage configurations, e.g., 5V at 3 A, 9V at 3 A, 15V at 3 A, or 20V at 3 A and requiring 15 W, 27 W, 45 W or 60 W for charging. In such case, the USB Type-C PD port 22,24 may charge the notebook using any of the 5V/3 A, 9V/3 A, 15V/3 A, or 20V/3 A configurations.

When both USB Type-C PD ports 22,24 are connected to a plurality of devices for charging, the receptacle 2 acts as a shared capacity USB PD receptacle and provide the highest common voltage for both USB Type-C PD ports 22,24 after negotiation. For example, the USB Type-C PD port 22 may be charging a handheld device 3A having a power profile including 5V/3 A configuration only, and the USB port 24 may be charging a laptop 3B having a power profile or rule including 5V/3 A, 9V/3 A or 12V/2.25 A configurations. In this example, respective USB PD controllers (discussed in further detail with reference to FIG. 3) coupled to the USB Type-C PD ports 22,24 may negotiate with each other as to which voltage configuration to adopt for charging these devices 3A,3B. That is, the USB Type-C PD controllers may negotiate that both USB ports 22,24 adopt the highest common voltage configuration usable by both devices 3A,3B, i.e., the 5V/3 A configuration, for charging the handheld device 3A and the laptop 3B simultaneously, and the USB ports 22,24 now act as a shared capacity charger. In another example, the USB Type-C PD port 22 may be charging a laptop having a power profile or rule which may include 5V/3 A, 9V/3 A, or 12V/2.25 A configurations, and the USB Type-C PD port 24 may be charging a hub having a power profile or rule which may include 5V/3 A, 9V/3 A, 15V/3 A or 20V/3 A configurations. In such case, the respective USB Type-C PD controllers coupled to the USB Type-C PD ports 22,24 may negotiate to adopt or use the highest common voltage configuration, i.e., 9V/3 A configuration, for charging the laptop and the hub simultaneously as a shared capacity charger. As such, based on the type of devices 3A,3B connected, the negotiation takes place and based on the negotiation the power sharing takes place between the two USB Type-C PD controllers, providing the highest common voltage configuration for charging the devices connected to both USB Type-C PD ports 22,24.

When only one of the USB ports 22,24 is connected to a device for charging, the receptacle 2 can provide a maximum power as per its charging capacity. For example, if a notebook 3B having a power profile or rule including 5V/3 A, 9V/3 A, 15V/3 A or 20V/3 A configurations is connected for charging, the receptacle 2 may provide a maximum power of 60 W using the 20V/3 A configuration for fast charging.

The display 30 may display real-time power usage for charging the devices 3A,3B, and may include a liquid crystal display. A microcontroller (discussed further in detail with reference to FIG. 3) may determine the real-time power usage. The real-time charging information may include power sharing information between the USB Type-C PD ports 22,24 when these ports 22,24 are used for charging a plurality of devices 3A,3B. For example, if the USB Type-C PD port 22 is charging a handheld device 3A using the 5V/3 A configuration, and the USB Type-C PD port 24 is to be used for charging a laptop 3B having a power profile or rule including 5V/3 A, 9V/3 A or 12V/2.25 A configurations, then respective USB Type-C PD controllers may negotiate with each other to adopt or use the voltage configuration usable by both devices 3A,3B, i.e., the 5V/3 A configuration, for charging the handheld device 3A and the laptop 3B simultaneously. Then, the display 30 may display the 5V/3 A configuration as the real-time voltage configuration on the LCD. If a single USB Type-C PD port 22,24 is being used for charging, the display 30 may display the real-time voltage configuration and the maximum power being used for charging. For example, the USB port 24 may be charging a hub having a power profile or rule including 5V/3 A, 9V/3 A, 15V/3 A, or 20V/3 A configurations. Since there is no power sharing between the two ports, the display 30 may display the maximum power, 60 W using the 20V/3 A configuration, on the LCD.

As the display 30 displays the real-time voltage configuration and the power being used, the receptacle 2 allows the user to monitor the real-time charging information, charging performance (e.g., charging speed or quality), whether right USB charging cables are being used, capacity or electric energy of power bank, etc. For example, a display of the real-time voltage configuration and the power being used may indicate that the user is using the correct USB charging cables. That is, if no charging information is displayed on the display 30, then the user may be using wrong USB charging cables. In some cases, the display 30 may display the real-time charging performance of the USB charging cables. For example, the display 30 may display an instantaneous percentage of the charges being made, e.g., 10, 20, 50, 80, or 100%, or a figure illustrating the instantaneous amount of the charges being made, e.g., a figure of a battery being charged.

By measuring and displaying the real-time charging information, the receptacle 2 enables the user to monitor the real-time voltage, current, and power reading from the display 30; easily check the charging performance (e.g., charging speed and quality) of the receptacle 2 and/or whether right USB charging cables are being used; and test capacity and electric energy of a power bank, e.g., for the USB Type-C PD ports 22,24. As such, the receptacle 2 reduces costs by eliminating the need for the user to connect an external power meter to monitor the charging information or add a converter circuit for power supply. Thus, the receptacle 2 provides a simplified power supply, requires no DC buck converter circuit, and has less BOM (bill of materials) count than the conventional receptacles.

Figure 3:
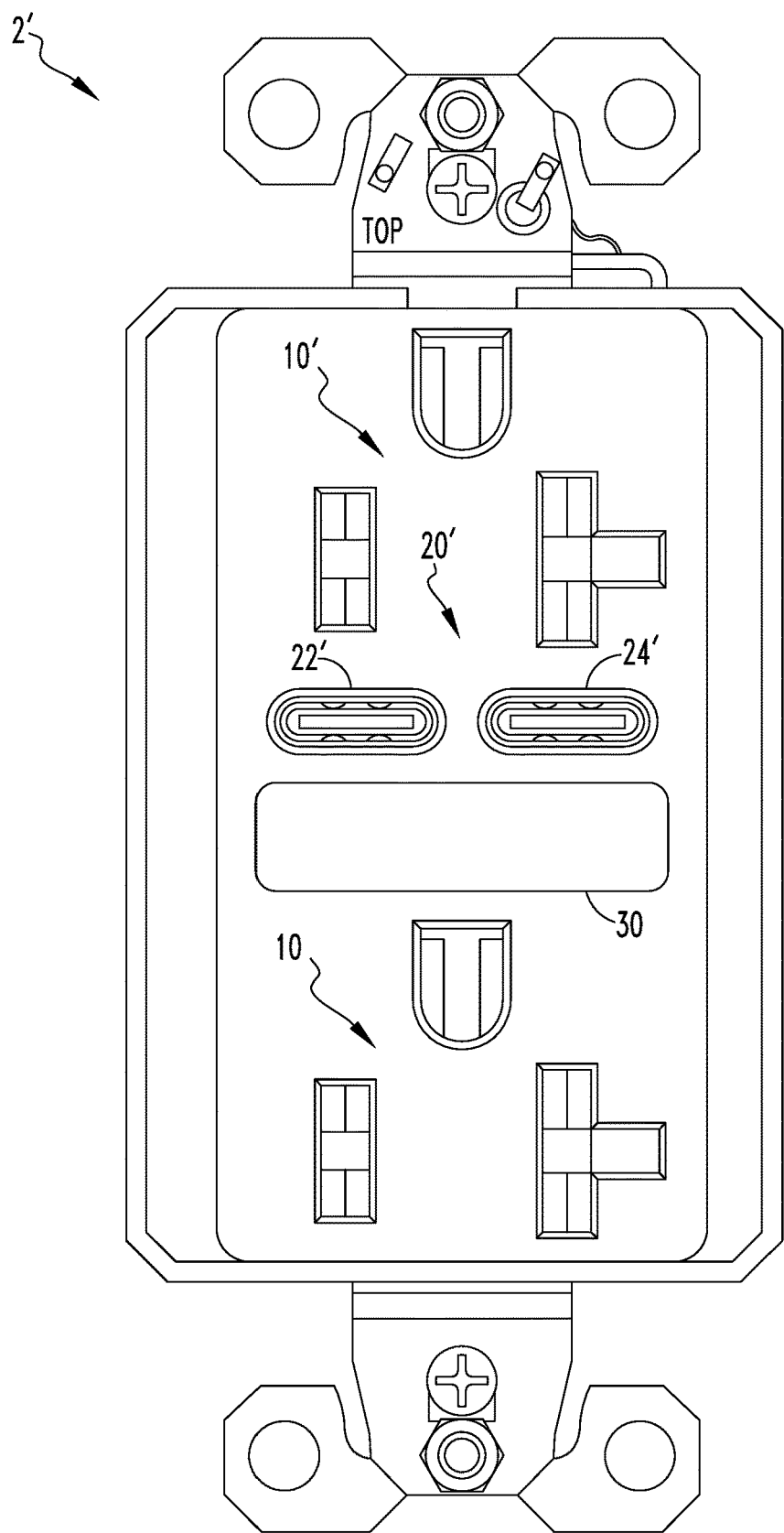
FIG. 3 is a front view of another example receptacle in accordance with an example embodiment of the disclosed concept.

FIG. 3 is a front view of another example receptacle 2' in accordance with an example embodiment of the disclosed concept. FIG. 3 mostly includes the elements and components of the receptacle 2' that are similar to those of the receptacle 2 in FIG. 2, and thus, the description of the similar elements and components are omitted. The receptacle 2' of FIG. 3 differs from the receptacle 2 of FIG. 2 in that the receptacle 2' includes a second power socket 10' and the arrangement of the USB ports 22', 24' horizontally from each other, rather than a vertical alignment from each other as described with reference to FIG. 2. Thus, FIG. 3 shows a dual USB receptacle 2' with two power sockets 10, 10'. This embodiment is advantageous in that it allows users preferring the traditional receptacles including two power sockets, rather than one (as described with reference to FIG. 2), to continue to use the preferred dual sockets 10, 10' while still being able to charge devices via the USB ports 22',24' in accordance with an embodiment of the disclosed concept.

Figure 4:
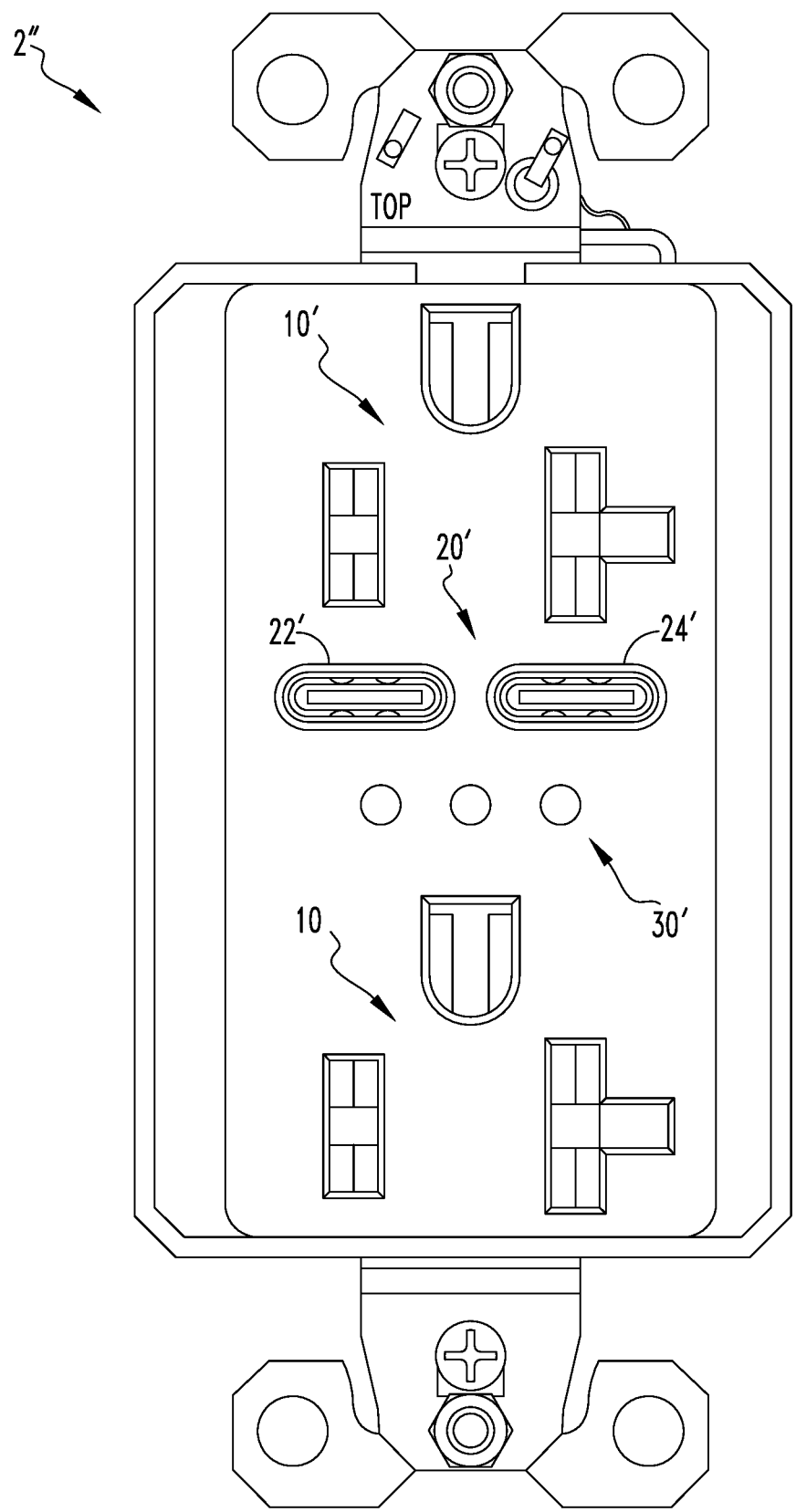
FIG. 4 is a front view of yet another example receptacle in accordance with an example embodiment of the disclosed concept.

FIG. 4 is a front view of yet another example receptacle 2" in accordance with an example embodiment of the disclosed concept. FIG. 4 mostly includes the elements and components of the receptacle 2" that are similar to those of the receptacle 2' in FIG. 3, and thus, the description of the similar elements and components are omitted. The receptacle 2" of FIG. 4 differs from the receptacle 2' of FIG. 3 in that the receptacle 2" includes one or more LEDs 30', rather than an LCD, configured and structured to display different levels of voltage being used for charging one or more devices by lighting the LED 30' in different colors. The one or more LEDs 30' may be multi-colored LEDs, e.g., RGB LEDs. For example, a green LED light may be lit if an accurate level of voltage is being used for charging one or more devices connected to the USB Type-C PD ports 22,24.

In that example, a yellow LED light may be lit if a less optimum level of voltage is being used for charging, or a red LED light may be lit if a wrong voltage or no voltage is being used, e.g., no charging due to using incorrect USB connectors. In another example, a green LED light may be lit if a lowest voltage configuration from the device's profile or rule is being used. In that example, a yellow LED light may be lit to indicate an intermediate voltage configuration being used for charging, or a red LED light may be lit to indicate a highest voltage configuration being used for charging. In some cases, the green LED light may indicate that the highest common voltage configuration for charging a plurality of devices connected to the USB Type-C PD ports 22,24 is being used. This embodiment is advantageous in that it gives the users an instantaneous feedback as to the real-time voltage levels being used and/or alerts the users if a less than optimum voltage level or no voltage is being used.

Figure 5:
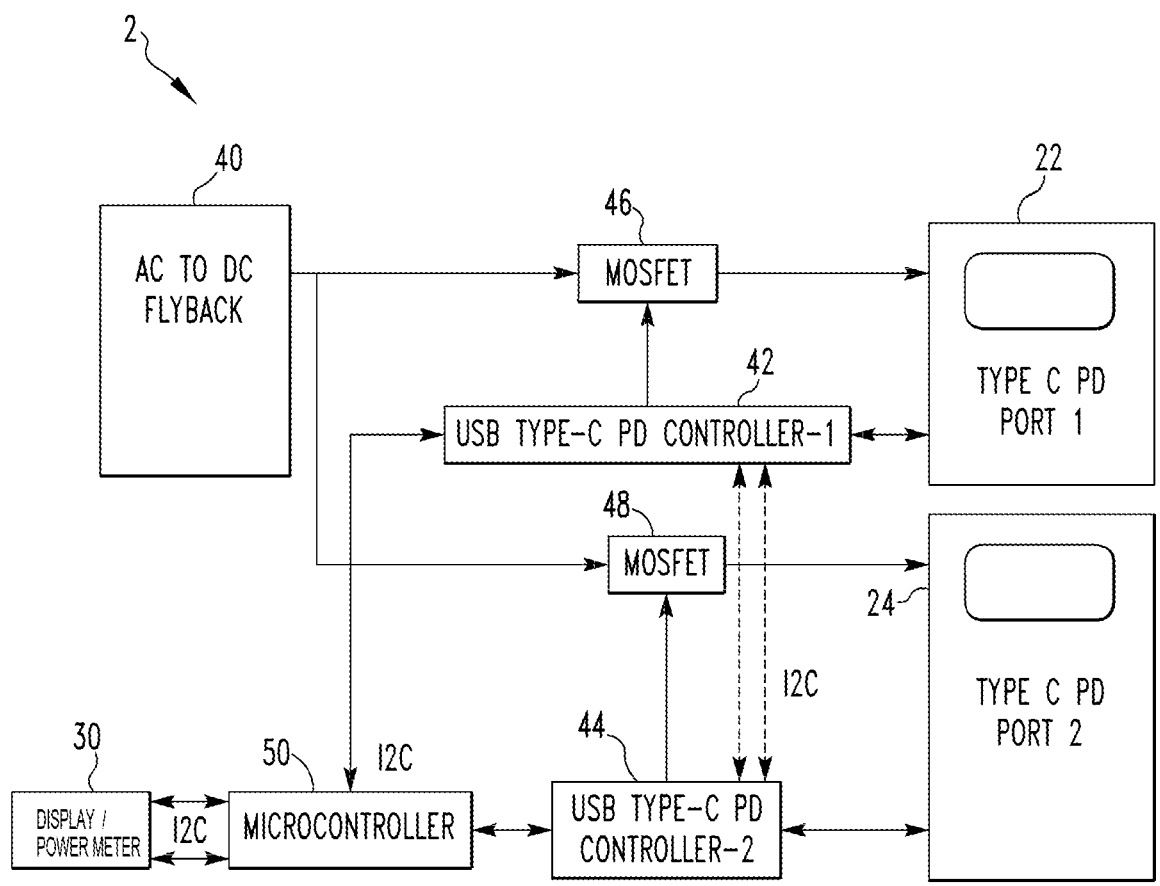
FIG. 5 is a schematic diagram of circuitry of a receptacle in accordance with an example embodiment of the disclosed concept.

FIG. 5 is a schematic diagram of circuitry of the receptacle 2 of FIG. 1 in accordance with an example embodiment of the disclosed concept. The circuitry includes an AC to DC flyback circuit 40, MOSFETs 46,48, USB Type-C PD controllers 42,44, USB Type-C PD ports 22,24, a microcontroller 50, and a display (i.e., display/power meter) 30. A flyback circuit 40 is coupled to MOSFET 46,48 and receives utility power and converts it for use by the USB Type-C PD ports 22,24. For example and without limitation, the flyback circuit 40 may convert AC utility power to DC power for use by the USB Type-C PD ports 22,24. While a flyback circuit 40 is shown in the present embodiment, it will be appreciated that the flyback circuit 40 is just one example of a power supply for converting AC utility power to DC power for use by the USB Type-C PD ports 22,24. Other types of power supplies may be employed in place of or in addition to the flyback circuit 40 without departing from the scope of the disclosed concept.

MOSFETs 46,48 act as a switch to turn on respective USB Type-C PD ports 22,24, and to pick an appropriate voltage configuration for charging connected devices. For example, if a single USB Type-C PD port 22 is being used for charging a hub having a power profile or rule including 5V/3 A, 9V/3 A, 15V/3 A, or 20V/3 A configurations, the MOSFET 46 may be caused by the USB Type-C PD controller 42 to turn on the USB Type-C PD port 22 and pick the 20V/3 A configuration as the maximum charging capacity. In another example, if the USB Type-C PD port 22 is charging a handheld device 3A using the 5V/3 A configuration and the USB Type-C PD port 24 is to charge a laptop, the MOSFETs 46,48 will switch to turn on respective USB Type-C PD ports 22,24 and pick the negotiated voltage configuration for the USB Type-C PD ports 22,24 for charging.

The USB Type-C PD controllers 42,44 are structured to provide for communication and power to the USB Type-C PD ports 22,24 in compliance with the USB PD specifications. The USB Type-C PD controllers 42,44 may be structured to provide a power profile or rule including 5V, 9V, 12V, 15V, or 20V to the USB Type-C PD port 22,24 in compliance with the USB PD specifications. The USB Type-C PD controllers 42,44 may negotiate with each other as to the appropriate voltage configuration to be adopted or used by communicating via I2C or any other similar protocols. The term "I2C (or I$^2$C)" stands for an inter-integrated circuit, and an I2C bus is a synchronous, multi-master, multi-slave, packet switched, single-ended, serial computer bus used for, e.g., attaching lower-speed peripheral ICs to processors and microcontrollers in short-distance or intra-board communications. The USB Type-C PD controllers 42,44 may communicate the real-time charging information including the negotiated power profile to a standalone microcontroller 50 via I2C or any other similar protocols. The microcontroller 50 may then transmit the charging information received from the USB Type-C PD controllers 42,44 to the display (e.g., without limitation an LCD, multi-colored LEDs, etc.) 30 via I2C or any other similar protocols, and the display 30 in turn displays the real-time charging information on the LCD 30. The real-time charging information may include the real-time reading of the voltage, current and power used for charging the devices, the power profiles information from the devices connected for charging, charging performance (e.g., charging speed or quality), capacity and/or electric energy of power bank, etc.

Figure 6:
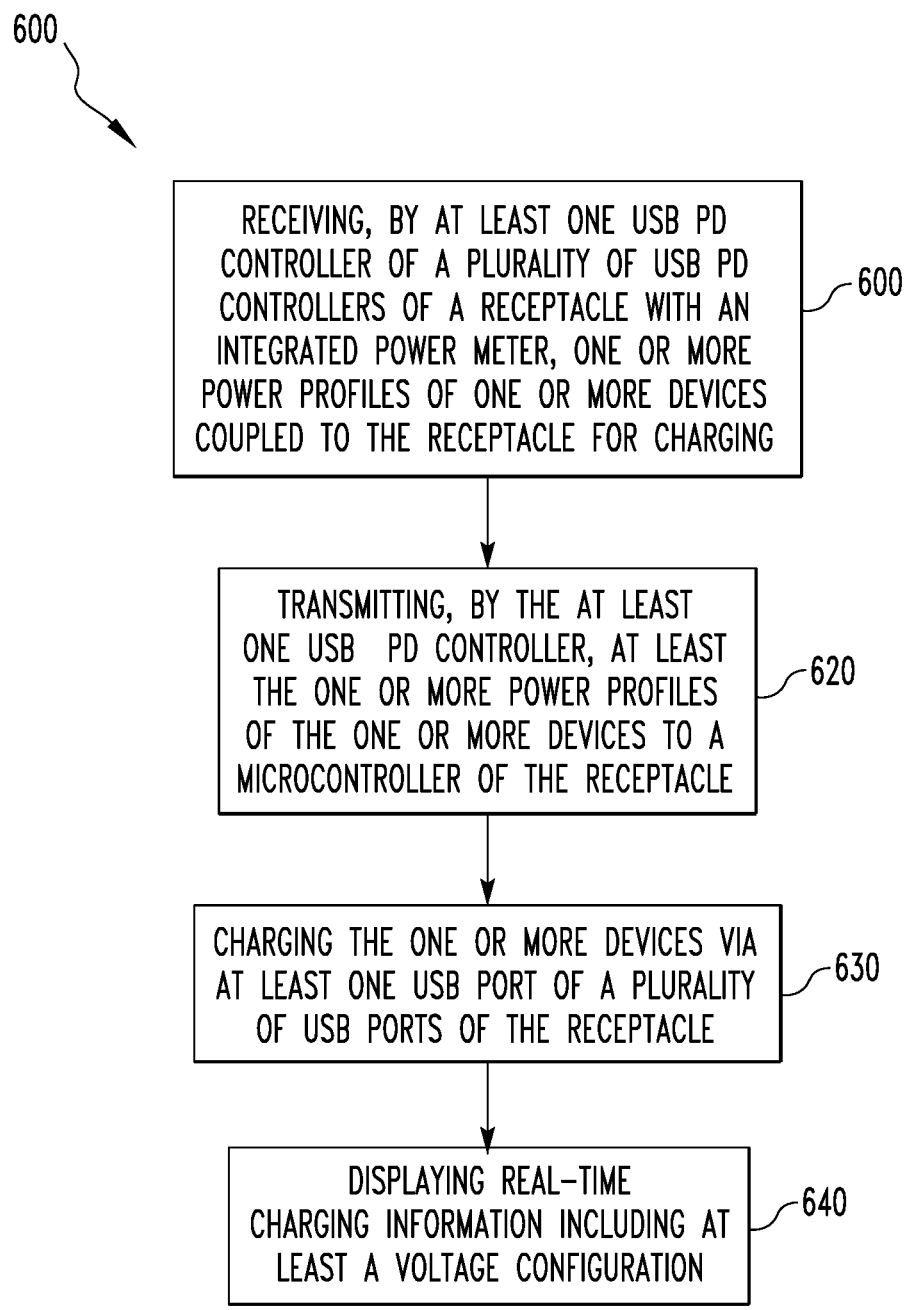
FIG. 6 is a flow chart for an example method for USB PD in accordance with an example embodiment of the disclosed concept.

FIG. 6 is a flow chart for an example method 600 for USB PD in accordance with an example embodiment of the disclosed concept. The method 600 may be performed by a receptacle with an integrated power meter (e.g., a receptacle 2,2',2" as described with reference to FIGS. 1-5) and/or any components thereof in accordance with an example embodiment of the disclosed concept.

At 610, at least one USB PD controller of a plurality of USB PD controllers of the receptacle may receive one or more power profiles of one or more devices coupled to the receptacle for charging. The USB PD controllers may be USB Type-C PD controllers 42,44 as described with reference to FIG. 5. The power profiles or rules may vary depending on a device type of the one or more devices to be charged. For example, a hand-held device may have a power profile or rule that may be corresponsive to a voltage configuration of 5V at 3 A only. In another example, a tablet may have a power profile or rule including a plurality of voltage configurations, e.g., 5V at 3 A, 9V at 3 A or 12V at 2.25 A. In yet another example, a notebook may have a power profile including a plurality of voltage configurations, e.g., 5V at 3 A, 9V at 3 A, 15V at 3 A, or 20V at 3 A.

At 620, the at least one USB PD controller may transmit at least the one or more power profiles to a microcontroller of the receptacle. The USB PD controllers may communicate with the microcontroller via a communication protocol, e.g., I2C or any other communication protocol that may be used for short-distance or intra-board communications.

At 630, the receptacle may charge the one or more devices via at least one USB PD port of a plurality of USB PD ports of the receptacle. In some examples, the USB PD ports may be structured and configured to receive USB Type-C connectors. The USB PD ports may be the USB Type-C PD ports 22,24 as described with reference with FIGS. 1-4, and may support 5V, 9V, 12V, 15V, and 20V in compliance with the USB PD specifications. When both USB PD ports are connected to a plurality of devices for charging, the receptacle may act as a shared capacity USB PD receptacle. When only one of the USB PD ports is connected to a device for charging, the receptacle can provide a maximum power as per its charging capacity. For example, if a notebook having power profile or rule including 5V/3 A, 9V/3 A, 15V/3 A, or 20V/3 A configurations, the receptacle may provide a maximum power of 60 W using the 20V/3 A configuration.

At 640, a display (e.g., without limitation an LCD, multi-colored LEDs) may display real-time charging information including at least a voltage configuration. The display may be the display 30, 30' as described with reference to FIGS. 1-5. The voltage configuration may include 5V, 9V, 12V, 15V, or 20V configurations. When a single USB PD port is being used for charging a device, the display may display a maximum power or a voltage level (e.g., in a numeric, illustrative, or color indication) being used for charging the device. When the plurality of USB PD ports are being used for simultaneous charging a plurality of devices, the display may display the real-time charging information including at least negotiated power information among respective USB PD controllers, e.g., negotiated power profile, negotiated voltage configuration, negotiated voltage level, etc. The real-time charging information may further include an indication of real-time charging performance of the receptacle and/or whether right USB charging cables are being used. In some examples, the display may be used to test capacity or electric energy of a power bank.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A receptacle comprising:
   a plurality of universal serial bus (USB) power delivery (PD) ports couplable to one or more devices to be charged;
   a plurality of USB PD controllers coupled to the plurality of USB PD ports in a one-to-one manner, wherein the plurality of USB PD controllers are structured and configured to negotiate power sharing when the plurality of USB PD ports are coupled to a plurality of devices to be charged, the negotiated power sharing including a highest common voltage to be used for charging the plurality of devices via the plurality of USB PD ports;
   a microcontroller coupled to the plurality of USB PD controllers and structured and configured to determine real-time power usage for charging the one or more devices and receive, from at least one USB PD controller of the plurality of USB PD controllers, real-time charging information including at least a power profile of the one or more devices to be charged; and
   a power meter with a display coupled to the microcontroller and structured and configured to receive the real-time power usage for charging the one or more devices and the real-time charging information from the microcontroller and display the real-time power usage for charging the one or more devices and the real-time charging information, wherein the real-time charging information further includes an indication of real-time charging performance of the USB PD ports including charging speed of the USB PD ports.

2. The receptacle of claim 1, wherein the plurality of USB PD ports comprise a plurality of USB Type-C PD ports.

3. The receptacle of claim 1, wherein the plurality of USB PD controllers comprise a plurality of USB Type-C PD controllers.

4. The receptacle of claim 1, wherein the power profile includes at least a voltage configuration comprising at least one of 5V, 9V, 12V, 15V, or 20V configurations.

5. The receptacle of claim 1, wherein the power profile depends on a device type of the one or more devices to be charged.

6. The receptacle of claim 1, wherein the plurality of USB PD controllers are structured and configured to negotiate power sharing based at least in part on a device type of the plurality of devices to be charged.

7. The receptacle of claim 1, wherein the display comprises a liquid crystal display (LCD).

8. The receptacle of claim 1, wherein the display comprises one or more light emitting diodes (LEDs).

9. The receptacle of claim 1, wherein the charging performance includes charging quality of the USB PD ports.

10. The receptacle of claim 1, wherein the display is structured and configured to indicate whether a right USB charging cable is being used for charging the one or more devices.

11. The receptacle of claim 1, wherein the display is structured and configured to indicate capacity or electric energy of a power bank.

12. The receptacle of claim 1, further comprising a power supply structured and configured to convert utility power for use by the USB ports.

13. The receptacle of claim 12, wherein the power supply includes a flyback circuit.

14. The receptacle of claim 1, wherein the microcontroller and the plurality of USB PD controllers are structured and configured to communicate with one another via a communication protocol.

15. The receptacle of claim 14, wherein the communication protocol comprises I2C protocol.

16. A receptacle comprising:
    a plurality of sockets structured and configured to receive one or more non-USB plugs;
    a plurality of universal serial bus (USB) ports couplable to one or more devices to be charged;
    a plurality of USB power delivery (PD) controllers coupled to the plurality of USB ports in a one-to-one manner, wherein the plurality of USB PD controllers are structured and configured to negotiate power sharing when the plurality of USB ports are coupled to a plurality of devices to be charged, the negotiated power sharing including a highest common voltage to be used for charging the plurality of devices via the plurality of USB PD ports;
    a microcontroller coupled to the plurality of USB PD controllers and structured and configured to determine real-time power usage for charging the one or more devices and receive, from at least one USB PD controller of the plurality of USB PD controllers, real-time charging information including at least a power profile of the one or more devices; and
    a power meter with a display coupled to the microcontroller and structured and configured to receive the real-time power usage for charging the one or more devices and the real-time charging information from the microcontroller and display the real-time power usage for charging the one or more devices and the real-time charging information, wherein the real-time charging information further includes an indication of real-time charging performance of the USB PD ports including charging quality of the USB PD ports.

17. A method for universal serial bus (USB) power delivery (PD) using a receptacle with an integrated power meter, comprising:
    receiving, by at least one USB PD controller of a plurality of USB PD controllers of the receptacle, one or more power profiles of one or more devices coupled to the receptacle for charging;
    transmitting, by the at least one USB PD controller, at least the one or more power profiles of the one or more devices to a microcontroller of the receptacle;
    negotiating, by the plurality of USB PD controllers, a power profile to be used for charging a plurality of devices coupled to the plurality of USB ports, wherein the negotiated power profile includes a highest common voltage to be used for charging the plurality of devices via the plurality of USB PD ports;

transmitting, by the plurality of USB PD controllers, the negotiated power profile to the microcontroller;

charging the plurality of devices via a plurality of USB ports of the receptacle;

determining, by a microcontroller coupled to the plurality of the USB PD controllers, real-time power usage for charging the one or more devices;

displaying, by the integrated power meter, the real-time power usage and real-time charging information including at least a voltage configuration and an indication of real-time charging performance of the USB PD ports including charging quality of the USB PD ports; and checking, via the integrated power meter, the real-time charging performance and test at least one of capacity or electric energy of a power bank.

18. The method of claim 17, wherein the real-time charging information further includes at least one of the negotiated power profile, whether correct USB charging cables are coupled to the plurality of USB ports and the plurality of devices, and capacity or electric energy of a power bank.

* * * * *